United States Patent [19]

Alexander

[11] 3,872,018

[45] Mar. 18, 1975

[54] WATER LOSS ADDITIVE FOR SEA WATER MUD COMPRISING AN ALKALINE EARTH OXIDE OR HYDROXIDE, STARCH AND POLYVINYL ALCOHOL

[75] Inventor: Albert H. D. Alexander, Houston, Tex.

[73] Assignee: Oil Base, Inc., Houston, Tex.

[22] Filed: Nov. 15, 1972

[21] Appl. No.: 306,856

[52] U.S. Cl............. 252/8.5 A, 252/8.5 C, 252/316
[51] Int. Cl............................................ C10m 3/16
[58] Field of Search............. 252/8.5 A, 8.5 C, 316

[56] References Cited
UNITED STATES PATENTS
3,633,689  1/1972  Christman...................... 252/8.5 A

| | | | |
|---|---|---|---|
| 3,716,486 | 2/1973 | Perricone | 252/8.5 A |
| 3,723,311 | 3/1973 | Lummus et al. | 252/8.5 A |
| 3,728,259 | 4/1973 | Christman | 252/8.5 B |

*Primary Examiner*—Benjamin R. Padgett
*Assistant Examiner*—B. Hunt

[57] ABSTRACT

Fluid loss control at temperatures over 300° F in clay-free sea water muds of the type containing alkaline earth oxides, hydroxides and salts in a brine solution and using starch as a fluid loss control agent is improved by addition of polyvinyl alcohol with the starch. Urea with the polyvinyl alcohol further increases temperature stability of the systems.

9 Claims, No Drawings

WATER LOSS ADDITIVE FOR SEA WATER MUD COMPRISING AN ALKALINE EARTH OXIDE OR HYDROXIDE, STARCH AND POLYVINYL ALCOHOL

BACKGROUND OF THE INVENTION

This invention relates to aqueous drilling fluids. More particularly, this invention relates to compositions of clay-free aqueous sea water or brine drilling fluids which demonstrate consistently low fluid loss rates even after exposure to high temperatures.

Well drilling operations are carried out using a variety of drilling fluids, some of which have an oil base, some of which are aqueous and some of which are oil-water emulsions. One prominent type of water base mud is the clay-water mud which typically uses chrome lignosulfonates or like lignin derivatives in combination with a heavy metal to achieve the necessary rheological properties. Other water base muds are the clay-free sea water muds formulated using a combination of alkaline earth compounds, typically calcium or magnesium compounds, in brine solution which may be formulated from sea water. These muds are ecologically superior in that they avoid using the poisonous heavy metal salts and also avoid the problems of maintaining the clay suspension system. These alkaline earth compound sea water muds also can be made completely acid soluble by choice of an appropriate acid soluble weighting agent, e.g., iron oxide.

Typical of these sea water drilling muds are those described in German Pat. No. 1,020,585 and also in co-pending U.S. application Ser. No. 300,389 entitled Aqueous Sea Water Drilling Fluids and filed Oct. 24, 1972 in the names of Geo. Miller and Horst Barthel as inventors, and assigned commonly as is this application. In addition, U.S. Pat. No. 2,856,256 relates to a magnesium hydroxide mud which might be formulated as a clay-free sea water mud, although use of clays is disclosed therein.

However, in formulating a clay-free mud of this type, it is necessary to provide additives which will minimize fluid loss from the borehole to the formation, i.e., minimize migration of the water in the mud from the borehole into the formation being drilled. In clay muds, the clay assists in the formation of a filter cake on the walls of the borehole which resists this fluid loss. In the clay-free muds, however, it has been necessary to provide fluid loss control materials to maintain fluid loss at desired levels.

It has long been known to use various types of starch in water base muds to perform this function. Synthetic polymeric materials such as urea resins have also been used. However, these latter materials are considerably more expensive.

Starch functions well as a fluid loss reducer component in clay-free muds at ordinary temperatures. But the starches which have been used cannot resist higher temperatures, such as at temperatures of 250° F to about 350° F, and their fluid loss control properties quickly dissipate at temperatures in this range. Under these conditions it becomes necessary to continually add starch to maintain fluid losses at tolerably low levels. At temperatures in the upper ends of this range and higher, the beneficial effect of the starches used dissipates quickly.

Current drilling practices which are tending toward deeper wells and consequent higher temperatures in the borehole, therefore, present problems to the use of conventional starches as fluid loss materials in clay-free sea water/brine type muds. Although particular combinations of starches might be formulated to give fairly good temperature resistance, it would be highly desirable to provide a more standardized approach to obtaining high temperature fluid loss properties in these clay-free muds.

SUMMARY OF THE INVENTION

There is accordingly provided by this invention, the additive material polyvinyl alcohol as a component of clay-free drilling fluids which enables maintenance of satisfactorily low fluid losses even at temperatures over 350° F.

In addition, this additive material provides high temperature protection to a wide spectrum of starches which can be used as fluid loss agents.

This invention also provides a novel clay-free aqueous drilling fluid which includes a small amount of polyvinyl alcohol in an amount sufficient to provide, together with a fluid loss control starch, low fluid losses, even at the temperatures mentioned.

The instant invention also provides a novel method for improving the high temperature fluid loss properties of clay-free muds.

Finally, there is provided by this invention a fluid loss control additive for clay-free muds comprising a starch and polyvinyl alcohol.

In accordance with this invention, a small amount of water-soluble polyvinyl alcohol in a clay-free mud, together with starch, affords good fluid loss control using a wide spectrum of starches, some of which would not be otherwise acceptable for use in clay-free muds. Typically, from about 2 to about 10 pounds per barrel of polyvinyl alcohol is sufficient. The material may be admixed with the starch before use to provide a ready to use fluid loss additive for sea water muds.

The clay-free sea water muds of the additive of this invention are disclosed in copending application Ser. No. 300,389, referred to above which is herein incorporated by reference as a disclosure of these mud systems. Generally, these sea water muds comprise an alkaline earth metal oxide or hydroxide (respecting the hydroxides, magnesium hydorxide can hydroxide used for such mud systems but calcium hydroxide alone does not appear to be satisfacotry; calcium oxide can be used and dolomitic quicklime which is a mixture of calcium and magnesium oxide can also be used), combined with magnesium salts such as magnesium chloride magnesium sulfate and/or magnesium carbonate in a brine solution which typically comprises potassium and magnesium salts dissolved in fresh water or sea water. The magnesium carbonate can be provided as dolomite or dolomitic limestone which contains both magnesium carbonate and clacium carbonate. Calcium sulfate, or gypsum is another typical component of these muds. The brine content is typically chosen with an eye toward minimizing heaving or sloughing of shale formations being drilled as will be understood by those skilled in the art and as disclosed in the aforementioned copending application.

Hence, these clay-free muds may be generally characterized as containing magnesium oxide and/or calcium oxide or magnesium hydroxide in combination with one or more compounds of magnesium, generally magnesium sulfate, magnesium chloride, and/or magnesium carbonate in a brine solution. The muds generally have a pH in the range of 8.8 to 9.5 and may be adjusted with calcium hydroxide. In some formulations an ammonium compound such as ammonium chloride is also provided, e.g., see U.S. Pat. No. 2,856,256. If dolomite is used to provide magnesium carbonate, calcium carbonate will also be present. Starch is also present as a fluid loss additive. Various starches can be used, as will be pointed out below. Typical starches used in the art are corn starch, potato starch, tapioca flour or the like. The muds may also contain other standard additives such as weighting agents, extreme pressure additives, defoamers, biocides and the like.

DESCRIPTION OF THE SPECIFIC AND PREFERRED EMBODIMENTS

Polyvinyl alcohol is a water soluble polymer prepared by alcoholysis of polyvinyl acetate. The degree to which the alcoholysis is carried out varies and produces polymers with different properties. Polymers which are 85 to 87% alcoholized may be employed in accordance with this invention. However, it is preferred to use the fully hydrolyzed polyvinyl alcohol polymers which are at least about 86 percent alcoholized. It is particularly preferred to utilize super-hydrolyzed polyvinyl alcohol which has been alcoholized at least 99 percent.

These polyvinyl alcohol polymers appear to function to protect the starch in the drilling fluid at high temperatures, though the precise mechanism of its operation in the compositions of the invention is not wholly understood. It appears that without starch present, the polyvinyl alcohol does not provide good fluid loss properties.

Molecular weight of the polyvinyl alcohol polymer is reflected by its viscosity. In accordance with this invention polyvinyl alcohols having what is referred to as a high viscosity are preferred (55 to about 65 cps. measured as a 4% aqueous solution at 20° C). These materials have a molecular weight in the range of at least about 170,000 to over 200,000.

The polyvinyl alcohol is employed in the drilling fluids in small amounts sufficient to provide elevated temperature stabilization to the starch employed. Hence, the amount can vary depending upon the starch employed and the susceptiblity of the starch to lose its effectiveness at the temperatures encountered. Generally, from about 2 to about 10 pounds of polyvinyl alcohol per barrel of drilling fluid is used. At higher concentrations, a gummy polymeric material appears when mud samples are tested for fluid loss in a filter press. However, the effect of such concentrations on the borehole under actual field conditions is not known. If additional amounts of starch must be added to the fluid to combat fluid loss, commensurate small amounts of the polyvinyl alcohol may be simultaneously added.

In accordance with this invention, it has been found that polyvinyl alcohol may be employed with a variety of starches. For example, although wheat flour has not been found useful alone as a fluid loss agent in clay-free drilling fluids, in combination with polyvinyl alcohol, wheat flour demonstrates satisfactory fluid loss control up to about 250° F. More preferably, the starches employed will include commercially available corn starch, potato starch, tapioca flour and the like. Of course, mixtures of starches can also be used as will be understood by those skilled in the art. These starches are typically pregelatinized starches that are cold water soluble. However, it is pointed out that a variety of commerically prepared starches are available, and their use is well established in the art.

In the clay-free muds of this invention, the starch is typically present in amounts of from about 10 to 30 pounds per barrel of drilling fluid. Of course, less can be used if a greater amount of fluid loss is desired for the mud. The starch is, of course, used in powdered form and is preferably physically admixed with the granular polyvinyl alcohol prior to addition to the mud system. Use of the polyvinyl alcohol will typically enable maintenance of low fluid losses at temperatures of 350° F.

In a particular aspect of this invention, still further improved thermal stability of the fluid loss system can be provided by admixing the polyvinyl alcohol with urea prior to incorporating the starch. Granular urea should be used in amounts of from about 1 to 10 parts by weight urea to 10 parts by weight of the polyvinyl alcohol. By the urea addition, it has been found that muds can be formulated using starch as the fluid loss agent and maintain low fluid loss at temperatures up to 380° F.

In a preferred aspect of this invention, a clay-free sea water mud to which starch and polyvinyl alcohol may be added may be formulated with the following compounds (in pounds per 42 gallon barrel of water).

FORMULA A (Sea Water)

36 lbs. dolomite (dolomitic limestone)
4.5 lbs. calcium oxide, magnesium oxide or mixture (e.g., dolomitic quicklime)
4.5 lbs. gypsum
15 lbs. magnesium sulfate (epsom salts)
15 lbs. potassium chloride.

FORMULA B (Sea Water)

47 lbs. dolomite (dolomitic limestone)
4 lbs. gypsum
4 lbs. calcium oxide, magnesium oxide or mixture (e.g., dolomitic quicklime)
54 lbs. magnesium chloride
60 lbs. magnesium sulfate (epsom salts)
15 lbs. potassium chloride
36 lbs. sodium chloride The above systems are exemplary only, and if will be understood that various formulations can be prepared using mixtures of alkaline earth compounds in brines as exemplified above. It will be noted that Formula B above contains a high concentration of dissolved salt in the brine and is useful in drilling formations with high salt content (e.g., carnallite, bischofite, etc.), as is understood in the art.

Generally, therefore, these exemplary muds may be characterized as comprising 30 to 70 percent by weight dolomite (preferably containing at least about 35 percent by weight magnesium carbonate), 20 to 60 percent by weight magnesium sulfate, magnesium chloride or mixtures thereof, about 3 to 10 percent by weight of calcium oxide, magnesium oxide, magnesium hydroxide or mixtures thereof in a brine solution. But other prior art muds are formulated using magnesium oxide alone or with ammonium compounds, or using magensium oxide or hydroxide with other magnesium salts such as magnesium sulfate or magnesium chloride.

Other additives may be added as indicated above. For example, specifically respecting the starch in the mud, biocides may be used to prevent bacterial attack, paraformaldehyde may be added to inhibit fermentation and the like. Other variations will be apparent to those skilled in the art.

Accordingly, there is provided hereby a method for providing high temperature stability to a wide variety of starches useful in aqueous drilling fluids, particularly the clay-free sea water type muds as disclosed above and in the cited art, which involves providing from about 2 to 10 pounds per barrel of high viscosity polyvinyl alcohol with the starch in the drilling fluid. This addition is preferably made by admixing the two ingredients prior to addition to the mud system, but also can be made independently.

The following examples are illustrative:

In the following examples, mud samples were prepared on a simulated barrel basis to provide the equivalent of 75 pounds of Formula A above in sea water. A number of various starches were used, all of which are commercially available.

Starch A — A high grade tapioca starch
Starch B — A cold water soluble corn starch
Starch C 13 A cold water swelling corn starch
Starch D — A modified cold water soluble anionic corn starch
Starch E — A pregelled wheat flour
Starch E — A water soluble corn starch
Starch G — A water soluble corn flour
Starch H — A potato starch
Mixture I — A mixture of 60% by weight Starch F, 20% Starch A and 20% Starch H After preparation, each sample was tested for apparent viscosity, plastic viscosity, gel strength and yield point. The rheology of the samples was not adversely affected by the variations in starch or addition of polyvinyl alcohol. Each sample was aged for 17 hours in rolling containers at the temperature indicated and then tested for fluid loss using the API high temperature — high pressure fluid loss test procedure (HT-HP).

The polyvinyl alcohols used had the following characteristics:

PV-1: 99 + % hydrolyzed, high viscosity
PV-2: 99 + % hydrolyzed, medium viscosity
PV-3: 98 % hydrolyzed, medium viscosity
PV-4: 87 % hydrolyzed, high viscosity

| Ex. No. | Fluid Loss Material | Aging Temp °F. | HT-HP Fluid Loss cc. (corrected) at | Temp. °F. |
|---|---|---|---|---|
| 1 | 5 ppb. Starch A<br>15 ppb. Starch B | 250° | 10.8 | 250° |
| 2 | 5 ppb. Starch A<br>15 ppb. Starch C | 250° | 12.0 | 250° |
| 3 | 5 ppb. Starch A<br>15 ppb. Starch D | 250° | 50+ | 250° |
| 4 | 5 ppb. Starch A<br>15 ppb. Starch E | 250° | 38.0 | 250° |
| 5 | 5 ppb. Starch A<br>15 ppb. Starch F | 250° | 9.4 | 250° |
| 6 | 5 ppb. Starch A<br>15 ppb. Starch G | 250° | 26.4 | 250° |
| 7 | 5 ppb. Starch A<br>15 ppb. Starch C<br>3 ppb. PV-1 | 250° | 5.8 | 250° |
| 8 | 5 ppb. Starch A<br>15 ppb. Starch G<br>3 ppb. PV-1 | 250° | 7.6 | 250° |
| 9 | 25 ppb. Mixture I<br>5 ppb. PV-2 | 340° | 27.6 | 300° |
| 10 | 25 ppb. Mixture I<br>5 ppb. PV-1 | 340° | 5.4 | 300° |
| 11 | 25 ppb. Mixture I<br>5 ppb. PV-3 | 340° | Uncontrolled | 300° |
| 12 | 25 ppb. Mixture I | 360 | Uncontrolled | 300° |
| 13 | 25 ppb. Mixture I<br>3 ppb. PV-1 | 360° | 20.8 | 300° |
| 14 | 25 ppb. Mixture I<br>5 ppb. PV-1 | 360° | 12.4 | 300° |
| 15 | 5 ppb. Mixture I<br>10 ppb. PV-3 | 340° | Uncontrolled | 300° |
| 16 | 5 ppb. Mixture I<br>10 ppb. PV-4 | 340° | 12.0 | 300° |
| 17 | 20 ppb. Starch G<br>5 ppb. PV-1 | 380° | 25.6 | 300° |
| 18 | 20 ppb. Starch G<br>5 ppb. PV-1<br>5 ppb. urea | 380° | 15.2 | 300° |
| 19 | 5 ppb. Starch A<br>15 ppb. Starch E<br>3 ppb. PV-1 | 250° | 7.8<br>43.8 | 250°<br>300° |
| 20 | 20 ppb. Starch E<br>3 ppb. PV-1 | 250° | 7.2<br>53.2 | 250°<br>300° |
| 21 | 20 ppb. Starch G<br>3 ppb. PV-1 | 250° | 6.8<br>9.8 | 250°<br>300° |

From the examples, it may be seen that by proper selection of starches, relatively good fluid loss characteristics can be obtained up to temperatures around 250° F (Example 5). In fact, Mixture I provides fairly good fluid loss properties up to temperatures as high as 300° C. However, it is apparent that by addition of the polyvinyl alcohol, the temperature resistance of all starches is significantly improved. At temperatures in excess of 300° F, the starch mixtures do not perform well unless sufficient polyvinyl alcohol is present (Compare Examples 12 and 14).

In Example 16, a gummy polymeric residue was detected after the high temperature, high pressure fluid loss test. However, the amount of starch in Example 16 was less than the amount of polyvinyl alcohol and accordingly increasing the amount of starch would tend to relieve this occurrence. According to the above examples, the use of a high viscosity polyvinyl alcohol can provide good fluid loss properties to a wide variety of starches and can indeed, particularly with the addition of urea, enable the formulation of a clay-free mud having moderately low fluid loss up to temperatures as high as 380° F.

Since one object of the invention is to provide a drilling fluid which does not require the presence of clay as a necessary component of the fluid, the phrase "clay-free" has been used herein to describe such a fluid. It should be understood, however, that during drilling operation clay from a formation being drilled may enter into the drilling fluid system. The drilling fluid defined herein will still function under such conditions as long as the amount of clay does not exceed by weight about 20 percent of the system.

What is claimed is:

1. An aqueous clay-free drilling fluid comprising an alkaline earth oxide or hydroxide dissolved in a brine solution and including starch as a fluid loss control agent, the improvement wherein said composition contains a small amount of polyvinyl alcohol polymer sufficient to maintain desirable fluid loss properties at elevated temperatures.

2. The drilling fluid of claim 1 wherein said polyvinyl alcohol is a high viscosity polymer.

3. The drilling fluid of claim 2 containing 2 to 10 pounds of said polyvinyl alcohol polymer per barrel.

4. The drilling fluid of claim 2 including from 1 to 10 parts by weight urea to 10 parts by weight of said polyvinyl alcohol.

5. The drilling fluid of claim 2 wherein said polyvinyl alcohol is at least 85% alcoholized.

6. An aqueous clay-free drilling fluid comprising a member selected from the group consisting of of calcium oxide, mangesium oxide and magnesium hydroxide, at least one additional magnesium compound selected from the group of magnesium chloride and magnesium carbonate in a brine solution and containing starch as a fluid loss agent and an amount of polyvinyl alcohol sufficient to maintain desirable fluid loss properties at high temperatures.

7. The drilling fluid of claim 6 wherein said starch is present in an amount of from about 10 to 30 pounds per barrel and said polyvinyl alcohol is present in amounts of 2 to about 10 pounds per barrel.

8. The drilling fluid of claim 6 wherein said polyvinyl alcohol is a high viscosity polymer which is at least 85 percent alcoholized.

9. The drilling fluid of claim 6 including from 1 to 10 parts by weight urea per 10 parts by weight of said polyvinyl alcohol.

* * * * *

UNITED STATES PATENT OFFICE
CERTIFICATE OF CORRECTION

Patent No. 3,872,018  Dated March 18, 1975

Inventor(s) Albert H. D. Alexander, Houston, Texas

It is certified that error appears in the above-identified patent and that said Letters Patent are hereby corrected as shown below:

Column 2, line 47, "hydorxide", second occurrence, should read --hydroxide--;

line 47, the word "hydroxide", third occurrence, should read --be--;

line 49, the word "satisfacotry" should read --satisfactory--;

line 58, the word "clacium" should read --calcium--.

Column 3, line 26, the numeral "86" should read --96--.

Column 5, line 25, the numeral "13" should be deleted and a hyphen substituted therefor;

line 29, the letter "E" should read --F--;

lines 51 through bottom of column, the percent symbol (%) should be deleted and substituted with a degree symbol (°) in all instances in the columns entitled "Aging Temp.°F" and "Temp.°F".

Column 6, lines 5 through 23, the percent symbol (%) should be deleted and substituted with a degree symbol (°) in all instances in the columns entitled "Aging Temp.°F" and "Temp.°F".

Column 7, line 9, the word "of", second occurrence, should be deleted;

line 10, the word "mangesium" should read --magnesium--.

Signed and Sealed this sixteenth Day of September 1975

[SEAL]

Attest:

RUTH C. MASON
Attesting Officer

C. MARSHALL DANN
Commissioner of Patents and Trademarks